INVENTOR.
JAMES E. HEYWOOD
BY John B. Clark
ATTORNEY

Nov. 26, 1963 J. E. HEYWOOD 3,112,396

ARITHMETIC CIRCUITRY

Filed May 3, 1957 6 Sheets-Sheet 2

Nov. 26, 1963 J. E. HEYWOOD 3,112,396

ARITHMETIC CIRCUITRY

Filed May 3, 1957 6 Sheets-Sheet 3

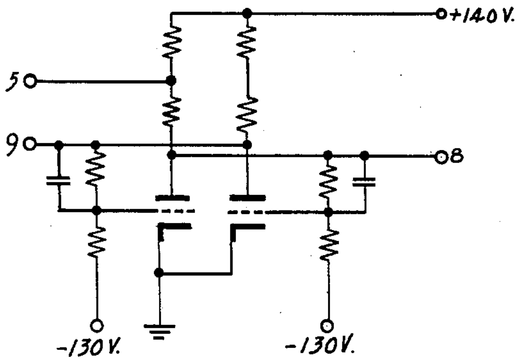
TR-2 FIG. 5
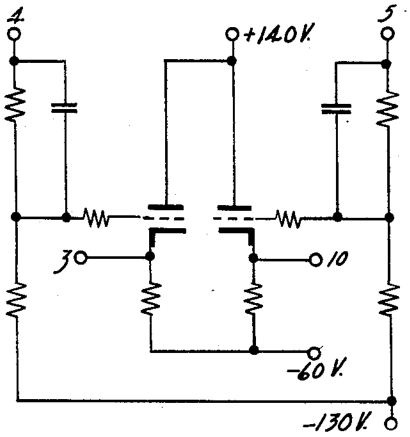
PCF-1 FIG. 6
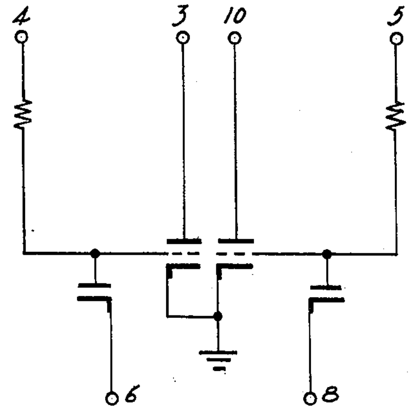
ID-2 FIG. 7
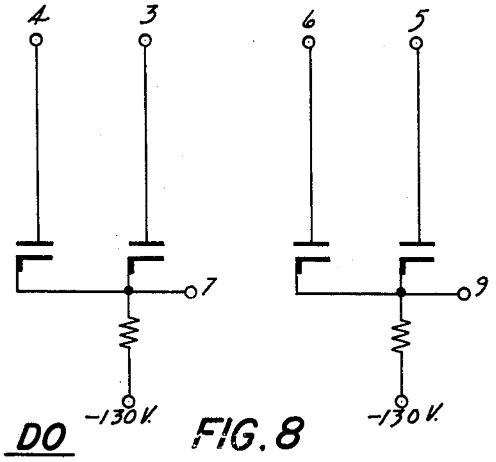
DO FIG. 8
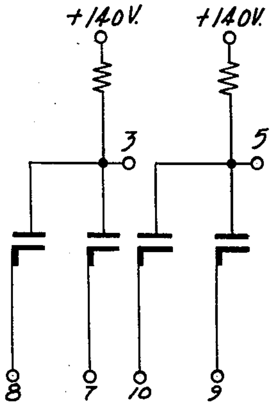
DA FIG. 9
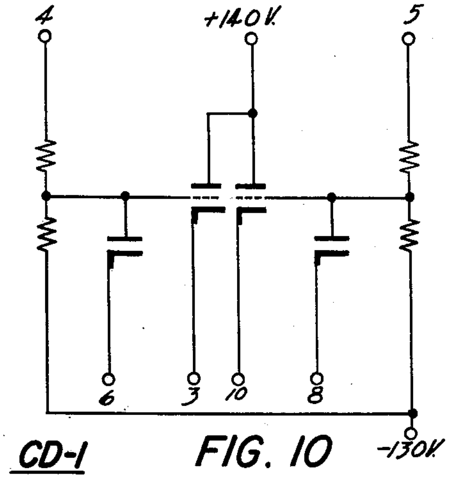
CD-1 FIG. 10

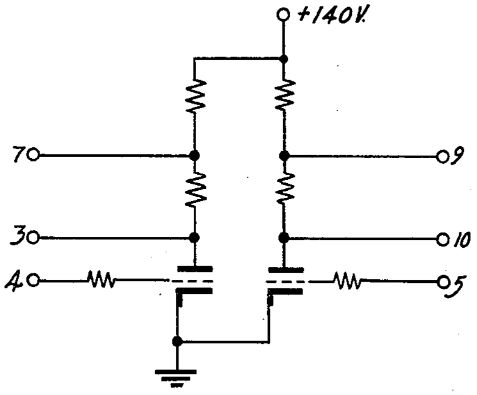
INV-2 FIG. 11
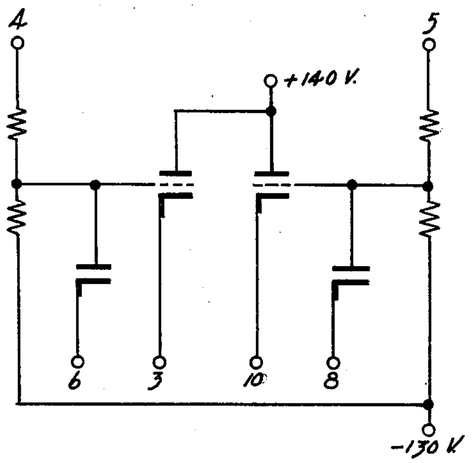
CD-2 FIG. 12
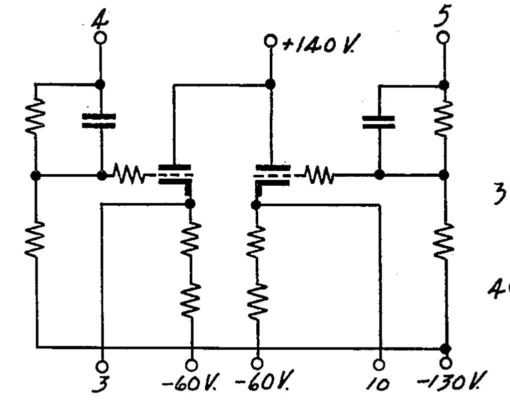
CF-1 FIG. 13
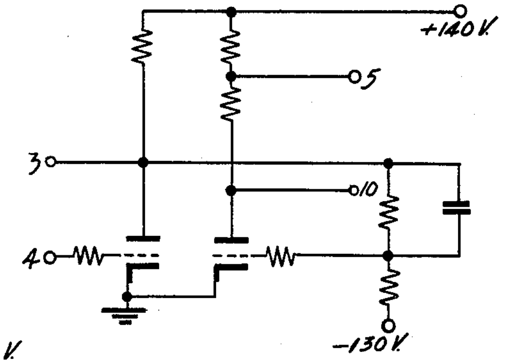
INV-3 FIG. 14
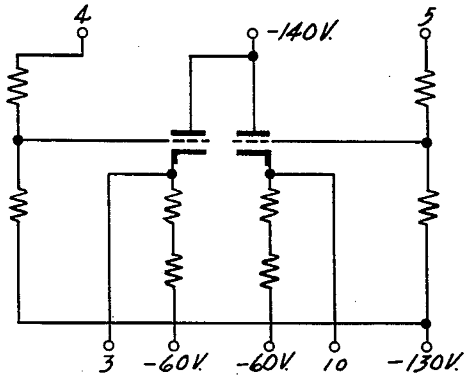
CF-2 FIG. 15
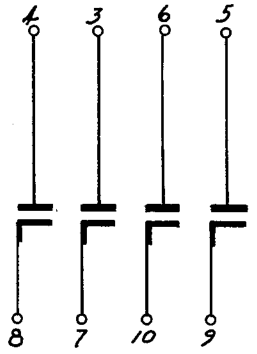
DD FIG. 16

United States Patent Office 3,112,396

Patented Nov. 26, 1963

3,112,396

ARITHMETIC CIRCUITRY

James E. Heywood, Palo Alto, Calif., assignor to International Business Machines Corporation, New York, N.Y., a corporation of New York Filed May 3, 1957, Ser. No. 656,785
11 Claims. (Cl. 235—170)

Figure 1:
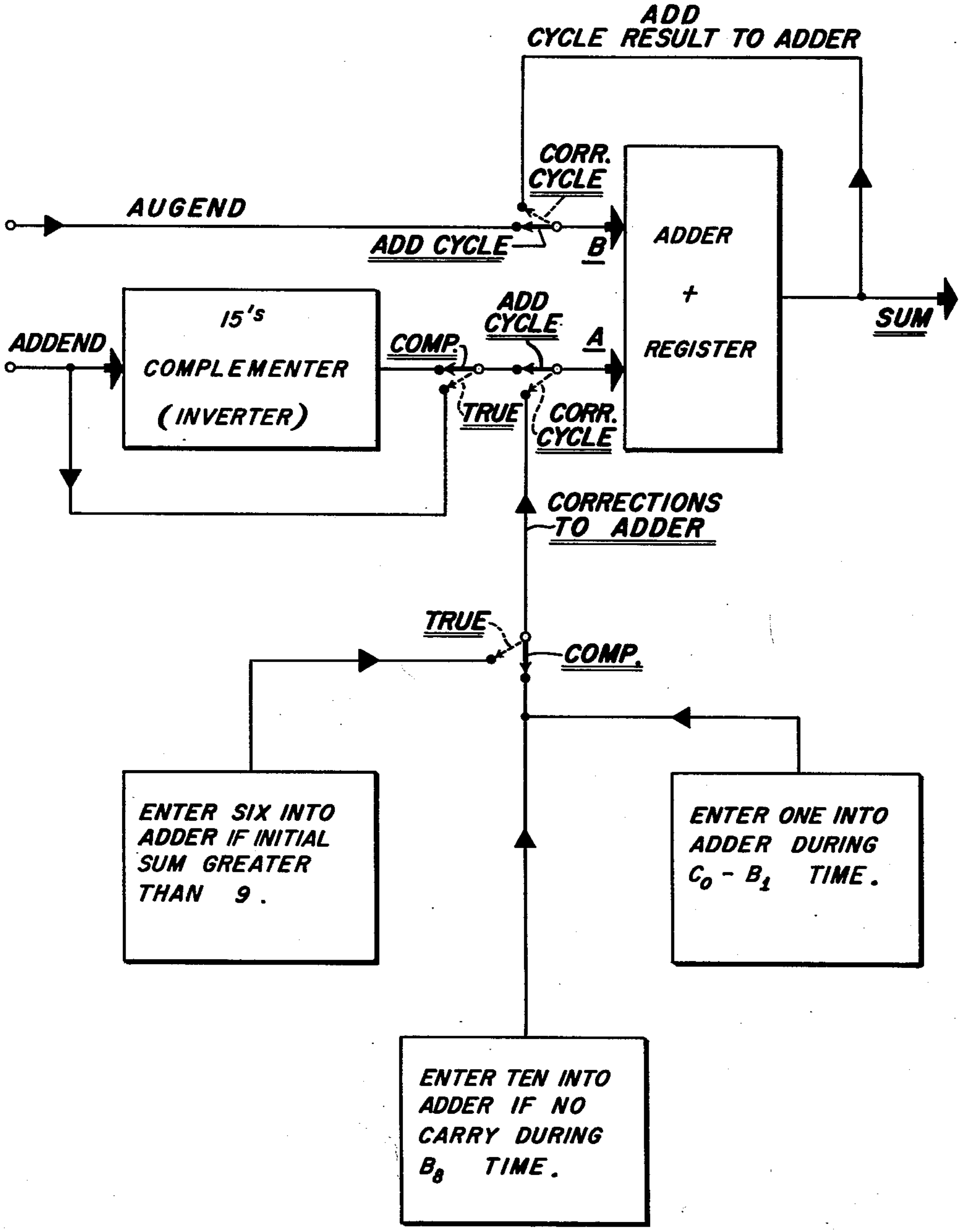

This invention pertains generally to arithmetic circuitry and relates more particularly to a circuit for adding and subtracting decimal numbers wherein each digit is represented in binary coded decimal form.

In various binary coded decimal systems decimal digits are represented by four binary signals termed "bits," which bits, reading from right to left, may correspond to the values $2^0$, $2^1$, $2^2$ and $2^3$ for representing the decimal digits 1, 2, 4 and 8, respectively. For example, the binary number 1001 represents a decimal digit 9, which is determined by the addition of decimal digits 1 and 8 indicated by a binary 1 in the extreme right and left binary positions, respectively. When utilizing the 8–4–2–1 code, simple binary addition methods may be used. However, problems arise which are not encountered in a pure binary system. One problem is the generation of a decimal carry. A decimal carry signal should be sent to the next higher order number when the sum of the bits of any given order is equal to or greater than 10. However, such a carry is not obtained solely by inserting a "1" bit in the next higher binary order, i.e., $2^4$, since this has the effect of carrying 16 instead of just 10. To maintain a number in binary coded decimal form, therefore, it will be clear that when the coded digit is greater than 9 a carry must be generated, and since a binary carry has the effect of carrying 16 instead of just 10, as is desired, it is necessary either to add 6 to the digit or to subtract 10 therefrom to effect a carry of only 10. Thus, the subtraction of 10 or the addition of 6, together with the provision of a carry signal to the next higher order digit, is necessary to maintain the digit in the binary coded decimal form when the sum of two binary coded decimal numbers exceeds 9.

Subtraction is accomplished by complement addition, the subtrahend being converted to its 10's complement form if negative. This may be accomplished by first converting the number to its 15's complement form by merely inverting the data signals. From its 15's complement form the data may then be converted to the 9's complement and a 1 may be added to the low order of the number to convert finally to 10's complement form. To obtain the 9's complement from the 15's complement it is necessary to add 10 to the result obtained by the inversion or to subtract 6 therefrom. In the first of the two methods a carry from the 8's order is obtained but this carry signal is ignored, which effectively subtracts 16 from the result. That the two processes yield the 9's complement may be illustrated mathematically by the equation $(15-D)-6=(15-D)+10-16$ where D is the decimal digit.

When, after summation, there is a carry, it is, as before, necessary to add 6 (or subtract 10) to put the number in decimal form. Under these circumstances, no correction other than the +1 correction is necessary since $(+6)+(-6)$ or $(-10)+(+10)$ equals no correction. It may now be said that on a complement add operation, i.e., when the subtrahend is negative as is the case where a positive subtrahend is to be subtracted or a negative subtrahend is to be added, a +1 correction is always inserted in one input of the adder at $B_1$ time of the low order digit of the subtrahend and a +10 correction is necessary only if, after summation, the sum does not exceed 9.

According to the invention a serial type binary adder is provided which has three inputs, i.e., the A, B and carry inputs. To permit operation in connection with an alphanumeric data processing machine, an 8-bit code is utilized, which bits are identified as $B_1$, $B_2$, $B_4$, $B_8$, $B_r$, $B_s$, $B_0$ and $B_x$, numerical values being represented by $B_1$, $B_2$, $B_4$ and $B_8$. The 8 bits of each character time are arranged to define two cycles, the first of which includes $B_1$, $B_2$, $B_4$ and $B_8$ and is denoted an add cycle, $B_r$, $B_s$, $B_0$ and $B_x$ defining a cycle referred to as the correction cycle. During the add cycle the numbers to be added are entered into the A and B inputs of the adder. After summation, the result is stored in a register and an inquiry is made to determine what corrections, if any, are necessary to convert the sum to its proper binary coded decimal form. During the following correction cycle the sum is read from the adder register back into the B input thereof and the necessary corrections are entered into the A input simultaneously therewith. The corrected sum in proper binary coded decimal form is then taken from the output of the adder. Thus, only one adder is necessary to provide for the addition (or subtraction) of two binary coded decimal numbers, the addition being made during the first portion of each character time and any corrections necessary to convert the sum to the proper binary coded decimal form being made during a second portion of each character time.

Thus, one object of the invention is to provide a novel circuit for adding or subtracting binary coded decimal numbers.

Another object of the invention is to provide a novel adder circuit wherein two numbers to be added are entered into the adder, the result taken therefrom being returned to the input of the adder together with the necessary corrections whereby the correct sum is taken from the output of the adder following the additions of corrections thereto.

Still another object is to provide a novel adder for adding in the binary fashion two decimal numbers represented digit for digit by binary notation, sensing the binary sum of each decimal column, and supplying corrections in timed sequence to the binary sum so that the resulting sum represents a decimal sum in binary notation digit for digit.

Another object of the invention is to provide a novel circuit for performing complement add operations.

A still further object of the invention is to provide a novel circuit for indicating whether or not the sum of two numbers exceeds a predetermined quantity whereby corrections are entered according to the determination.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a block diagram of the circuitry of the invention.

Figure 2:
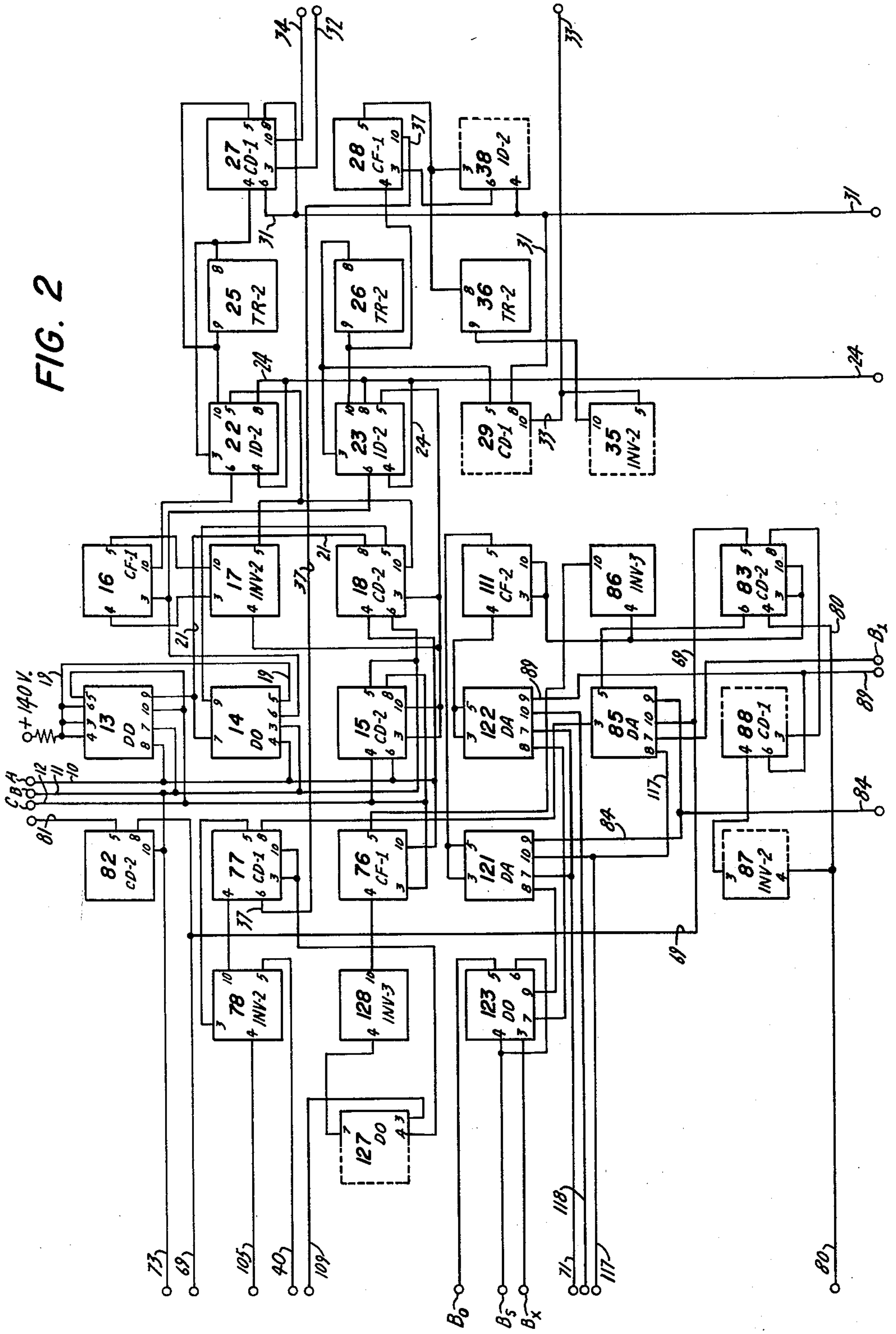
Figure 3:
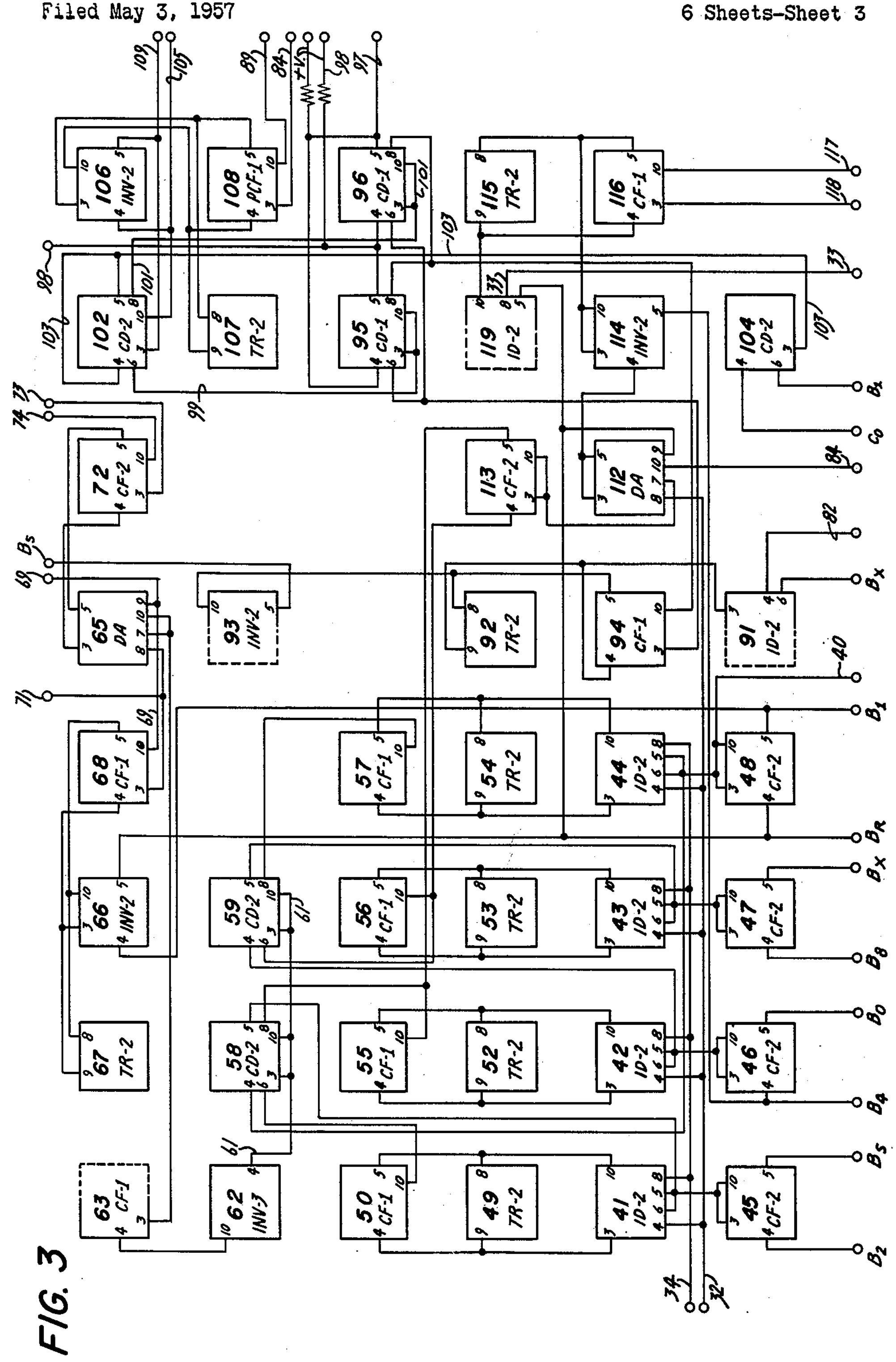

FIGS. 2 and 3 comprise a schematic diagram of an embodiment of the invention.

Figure 4:
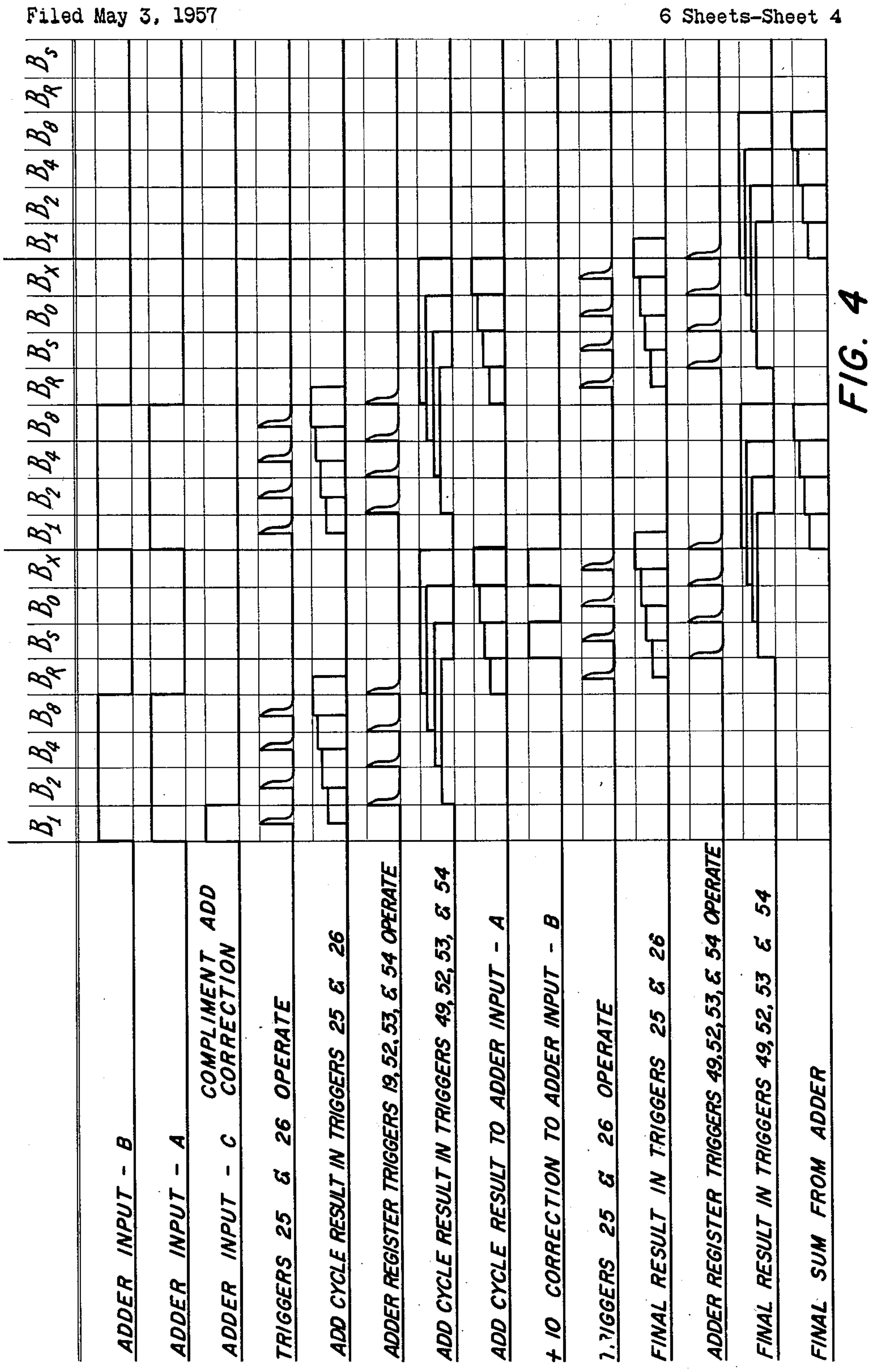

FIG. 4 is a timing diagram illustrating the operation of the circuitry shown in FIGS. 2 and 3.

FIGS. 5 through 16 disclose detailed schematic diagrams of the various electronic components shown in block form in FIGS. 2 and 3.

The embodiment of the invention shown in FIGS. 2 and 3 and fully described herein is adapted for use with a serial machine, i.e., a serial-by-character, serial-by-bit machine. Each character time defines 8 bit times which are identified as $B_1$, $B_2$, $B_4$, $B_8$, $B_r$, $B_s$, $B_0$ and $B_x$, the various characters being identified as $C_0$, $C_1$, $C_2$, etc., wherein $C_0$ is the first character transferred in a data transfer operation. It will be assumed in the present description that all numerical data is transferred low order digit first as well as low order bit first. Thus, the low order digit of both the augend and addend is transferred during $C_0$ time, the 10's order digit being transferred during $C_1$ time, etc. The 8–4–2–1 decimal code is utilized herein, and it will be clear that since the low order bit of each character is transferred first, the bit sequence is $B_1$, $B_2$, $B_4$, $B_8$ in that order.

It should be noted that the various electronic components disclosed in the drawings are illustrated in block form. Detailed schematics of these components are shown in FIGS. 5 through 16 and a brief description thereof is given in the appendix hereto.

A functional block diagram (FIG. 1) illustrates the invention generally, the detailed circuitry being shown in FIGS. 2 and 3. The block diagram shown in FIG. 1 is substantially self-explanatory, at least in view of the text to follow, and further description thereof will not be given here. The adder circuitry per se (FIG. 2) includes three inputs labeled A, B and C, respectively, and identified by the reference numerals 10, 11 and 12, respectively. The two numbers to be added are entered into the A and B inputs, carries being entered into the C input. The adder itself is a full binary adder and comprises six electronic components identified by the reference numerals 13 through 18 as indicated in the drawing. The unit 13 is a DD unit, the #8, #7 and #10 taps of which connect to the lines 10, 11 and 12, respectively, and the #3, #4 and #6 taps of which connect via a line 19 to the #5 tap of the unit 14, a DO unit. That portion of the DD unit 13 associated with the #8, #7 and #10 taps thereof is connected as an "and" gate, and when all three of these taps are high the line 19 is high. Thus, the line 19 rises only when bits are present on the lines 10, 11 and 12 simultaneously. The DO unit 14 is connected as two independent "or" circuits, and when either the #5 or #6 tap of this unit is high, the #9 tap thereof rises. Similarly, when either the #3 or #4 tap thereof is high, the #7 tap rises. It should be noted that the #3 and #4 taps of the unit 14 connect to the lines 11 and 10, respectively, and when bits are present on either or both of the lines 10 and 11, the #7 tap of the unit 14 goes up. Additionally, the carry line 12 connects to the #5 tap of the unit 13, the #9 tap of which is connected to the #7 tap of the unit 14. Thus, a line 21 connected to the #7 tap of the unit 14 rises if there is a signal on at least one of the lines 10, 11 and 12.

The #6 tap of the unit 14 connects to the #3 tap of the CF–1 unit 16 and is arranged to go up only if there is no carry. This situation is determined by the units 15 and 18. The #4 and #6 taps of the CD–2 unit 15 connect to the lines 12 and 10, respectively, the #5 and #8 taps of this unit being connected to the lines 11 and 12, respectively. Additionally, the #4 and #6 taps of the CD–2 unit 18 connect to the lines 10 and 11, respectively. The #3 and #10 taps of the unit 15 connect to the #3 tap of the unit 18 as well as to the #4 tap of the INV–2 unit 17, and it will be clear, therefore, that the #4 tap of the unit 17 rises only if all three of the lines 10, 11 and 12 are high. The #3 tap of the unit 17 connects to the #4 tap of the unit 16. Thus, the #3 tap of the unit 16 and the #6 tap of the unit 14 rise only when there is no carry. It should now be understood that the #5 tap of the unit 18 goes up when there is no carry or when all three lines 10, 11 and 12 are up, i.e., when there is both a sum and a carry, since the #9 tap of the unit 14 connects to the #5 tap of the unit 18. That portion of the unit 18 associated with the #5 and #8 taps is arranged to determine whether or not there is a sum during any particular bit time, and when the #5 and #8 taps thereof are high simultaneously, the #10 tap rises and indicates a sum. This is true since the #5 tap of the unit 18 rises if there is no carry or if there is a sum and a carry and the #8 tap rises if there is a pulse on at least one of the inputs to the adder. Thus, the #10 tap of the unit 18 rises when, but only when, a sum is indicated.

The #10 tap of the unit 18 connects to the #5 tap of the inverter 17, the #10 tap of which connects to the #5 tap of the CF–1 unit 16. Thus, the #10 tap of the unit 16 is high when there is no sum. The #10 tap of the unit 18 additionally connects to the #5 tap of an ID–2 unit 22, the #6 tap of which is connected to the #10 tap of the CF–1 unit 16. The #4 and #8 taps of the unit 22 connect to a source 24 of phase B clock pulses, and if there is a sum, the #10 tap of the unit 22 drops at phase B time of the corresponding bit time, the #3 tap of the unit 22 being arranged to drop at this time if there is no sum.

The #3 tap of the CD–2 unit 18, which tap is high if there is a carry, connects to the #5 tap of an ID–2 unit 23. The #6 tap of the unit 23 connects to the #3 tap of the CF–1 unit 16, which tap is high when there is no carry, as explained. The #4 and #8 taps of the unit 23 connect to the phase B clock pulse line 24, and when there is a carry, the #10 tap of the unit 23 drops at the corresponding phase B time, the #3 tap of the unit 23 being arranged to drop at this time when there is no carry.

A TR–2 unit 25 is provided to indicate the sum and no-sum conditions, a TR–2 unit 26 being provided to indicate the conditions carry and no-carry. The #10 tap of the ID–2 unit 22 connects to the #9 tap of the TR–2 unit 25 as well as to the #5 tap of a CD–1 unit 27, and the #3 tap of the unit 22 connects to the #8 tap of the unit 25 as well as to the #4 tap of the unit 27. Similarly, the #10 tap of the unit 23 connects to the #9 tap of the TR–2 unit 26 as well as to the #4 tap of a CF–1 unit 28, the #3 tap of the unit 23 being connected to the #8 tap of the unit 26 as well as to the #5 tap of a CD–1 unit 29. Thus, if there is a sum the trigger 25 is switched to a condition wherein the #8 tap thereof is high, the #9 tap being high if there is no sum. Similarly, when there is a carry, the trigger 26 is switched to a condition wherein the #8 tap is high, the #9 tap of this trigger being high if there is no carry.

The phase A clock pulse line 31 connects to the #6 and #8 taps of the CD–1 unit 27 as well as to the #8 tap of the CD–1 unit 29. Thus, if there is a sum corresponding to a given bit time, the #3 tap of the unit 27 rises during the next following bit time, thereby raising the potential of a line 32 connected thereto. Similarly, when there is a carry, a line 33 connected to the #10 tap of the unit 29 rises during the next following bit time. The lines 32 and 33 are termed the sum and carry lines, respectively. It was mentioned that the #9 tap of the trigger 25 connects to the #5 tap of the CD–1 unit 27. Thus, when there is no sum corresponding to a given bit time, a line 34 rises during the next following bit time. The line 34, therefore, is termed the no-sum line. It should be clear that the signals taken from the lines 32, 33 and 34 are delayed one bit time.

The carry line 33 additionally connects through an INV–2 unit 35 for operating a TR–2 unit 36, and when there is a carry the trigger 36 is operated to raise the potential of the #8 tap thereof. This tap connects to the #5 tap of the CF–1 unit 28 for controlling the potential of a line 37 connected to the #10 tap of the unit 28 for indicating the presence of a carry, the line 37 being connected, as will be explained, through several electronic components to the C input to the adder. Thus, when there is a bit carry, the line 37 rises during the next following bit time. If there is no carry, the trigger 36 is reset during the next following bit time since the #9 tap of the TR–2 unit 26 is connected through the CF–1 unit 28 to the #6 tap of an ID–2 unit 38 where the no-carry signal is mixed with phase A clock pulses for operating the trigger 36 to lower the potential of the #8 tap thereof. Thus, when there is no carry, the #3 tap of the unit 38 drops at the beginning of the following bit time, thereby setting the trigger 36 in a condition wherein the #8 tap thereof is low.

The triggers 25 and 26 are termed the "result" triggers and these triggers indicate, as explained, the presence or absence of sums and carries. From the result triggers the sum and carry signals are entered into the adder register. Referring to FIG. 3, the sum line 32 connects to the #4 tap of each of four ID–2 units 41, 42, 43 and 44, the no-sum line 34 being connected to the #8 tap of each of these ID–2 units. The $B_2$ and $B_s$ lines connect to the #4 and #5 taps, respectively, of a CF–2 unit 45, the $B_4$ and $B_o$ lines being connected to the #4 and #5 taps, respectively, of a CF–2 unit 46, etc. The #3 and #10 taps of the unit 45 connect to the #5 and #6 taps of the ID–2 unit 41 for mixing the $B_2$ and $B_s$ pulses with the sum and no-sum signals. The #3 tap of the unit 41 connects to the #9 tap of a TR–2 unit 49 as well as to the #4 tap of a CF–1 unit 50, the #10 tap of the unit 41 being connected to the #8 tap of the trigger 49 and to the #5 tap of the CF–1 unit 50.

A sum during $B_1$ time or during $B_r$ time is entered into the trigger 49 during the next following bit time. For this reason the sum and no-sum signals are mixed with $B_2$ and $B_s$ pulses in the unit 41 for operating the trigger 49, these signals being mixed with $B_4$ and $B_o$ pulses in the unit 42 for operating a trigger 52, etc. Thus, for example, if there is a sum during $B_1$ time, the trigger 49 is operated to raise the potential of the #8 tap thereof by the next following $B_2$ pulse. Similarly, if there is no sum during $B_r$ time, for example, trigger 49 is operated to raise the potential of the #9 tap thereof by the next following $B_s$ pulse. It should also be noted that sums during $B_2$ and $B_s$ times are stored in the trigger 52, sums during $B_4$ and $B_o$ times are stored in a trigger 53, and sums during $B_8$ and $B_x$ times are stored in a trigger 54. Thus, the sum is entered into the "adder register" triggers 49, 52, 53 and 54 after a 1-bit delay.

The #10 tap of the unit 50 connects to the #6 tap of a CD–2 unit 58, the #10 tap of a CF–1 unit 55 being connected to the #8 tap of the unit 58. The #10 tap of a CF–1 unit 56 connects to the #6 tap of a CD–2 unit 59, the #8 tap of the unit 59 being connected to the #10 tap of a CF–1 unit 57. The sum signals taken from the #10 tap of the unit 50 are mixed in the unit 58 with $B_1$ or $B_r$ pulses, which pulses are connected from the #3 tap of the CF–2 unit 48 to the #4 tap of the CD–2 unit 58. The sum signals taken from the #10 tap of the CF–1 unit 55 are mixed in the unit 58 with $B_2$ and $B_s$ pulses since the #3 tap of the CF–2 unit 45 connects to the #5 tap of the CD–2 unit 58. In a similar manner, the sum pulses taken from the #10 tap of the CF–1 unit 56 are mixed with $B_4$ and $B_o$ pulses in the unit 59 and the sum pulses taken from the #10 tap of the unit 57 are mixed in the unit 59 with $B_8$ and $B_x$ pulses.

Assuming, for example, that a sum is determined during $B_1$ time and is entered into the trigger 49 during $B_2$ time, it is not read therefrom until the following $B_r$ time, at which time a $B_r$ pulse is taken from the #3 tap of the CD–2 unit 58. Signals entered into the "2" bit trigger 52 during $B_4$ time are read therefrom during the following $B_s$ time, etc. Thus, three bit times after the signals are entered into the adder register triggers 49, 52, 53 and 54, they are read therefrom onto a line 61 connected to the #3 and #10 taps of the CD–2 units 58 and 59. This line connects through an INV–3 unit 62 and through a CF–1 unit 63 to the #7 and #10 taps of a DA unit 65. The DA unit 65 is connected as two independent "and" circuits, and signals present on the #7 and #10 taps thereof are mixed therein with gating signals referred to as the "add cycle" and the "correction cycle" signals.

As was mentioned earlier herein, the add cycle is defined by bit times $B_1$ through $B_8$, the correction cycle being defined by bit times $B_r$ through $B_x$. The $B_1$ line connects to the #4 tap of an INV–2 unit 66, the #3 tap of which connects to the #9 tap of a TR–2 unit 67. Additionally, the $B_r$ line connects to the #5 tap of the unit 66, the #10 tap being connected to the #8 tap of unit 67. Thus, at $B_1$ time the trigger 67 is operated to raise the potential of the #8 tap, this condition being reversed at $B_r$ time to raise the potential of the #9 tap. The #9 tap of the trigger 67 connects to the #4 tap of a CF–1 unit 68, the #8 tap of the trigger 67 being connected to the #5 tap of the CF–1 unit. Thus, the #10 tap of the unit 68 is high throughout $B_1$, $B_2$, $B_4$ and $B_8$, the #3 tap of this unit being high throughout $B_r$, $B_s$, $B_o$ and $B_x$, and it will be clear that the add cycle signal is taken from a line 69 connected to the #10 tap of the unit 68, the correction cycle signal being taken from a line 71 connected to the #3 tap of the unit 68.

The line 69 connects to the #9 tap of the DA unit 65 and the line 71 connects to the #8 tap of this DA unit. Thus, during the correction cycle signals taken from the adder register triggers pass through the DA unit 65 to the #3 tap thereof, and during the add cycle these signals pass through the unit 65 to the #5 tap. The #3 and #5 taps of the unit 65 connect to the #4 and #5 taps, respectively, of a CF–2 unit 72, and during the correction cycle the signals read from the adder register triggers appear on a line 73 connected to the #3 tap of the unit 72, these signals appearing on a line 74 during the add cycle.

Numbers to be added are initially entered into the adder during $B_1$, $B_2$, $B_4$ and $B_8$ times and the results of the addition of each order are read from the adder register during the following correction cycle, i.e., during the $B_r$, $B_s$, $B_o$ and $B_x$ times. These signals are taken from the line 73 and are entered into the B input to the adder. Additionally, the necessary corrections are entered into the A input to the adder at this time. Before proceeding with the description of the entry of correction signals into the adder during the correction cycle, however, a description of the entry of carries onto the line 12 will first be given.

The carry line 12 (FIG. 2) connects to the #3 tap of a CF–1 unit 76 and all carry signals entered into the adder during either the correction cycle or the add cycle are taken from this tap. It will be recalled that if there is a carry, the line 37 rises during the bit time following the bit time from which the carry resulted. This line connects to the #6 tap of a CD–1 unit 77, the #4 tap of which is controlled to be high except during $B_1$ and $B_r$ times. The #4 tap of the unit 77 connects to the #10 tap of an INV–2 unit 78, the #5 tap of which connects via a line 40 to the #3 and #10 taps of the CF–2 unit 48 (FIG. 3), which taps, it will be recalled, rise during $B_r$ and $B_1$ times. Thus, bit carries entered in the trigger 36 (FIG. 2) appear on the #3 tap of the unit 77 except during $B_1$ and $B_r$ times. The #3 tap of the unit 77 connects through a DO unit 127 and through an INV–3 unit 128 to the #4 tap of the CF–1 unit 76, and carry signals are therefore entered into the C input to the adder when the #8 tap of trigger 36 is high except during $B_1$ and $B_r$ times.

The reason for preventing the entry of a carry during $B_1$ time is that a carry during $B_1$ time results from the addition of bits during $B_x$ time, which carry is meaningless since at this time all corrections to the sum have been made and the answer is in correct form. Additionally, any carries present in the trigger 36 during $B_r$ time result from the addition of bits during $B_8$ time. Although such a carry is utilized to set up the circuitry for inserting a decimal carry during the next following $B_1$ time, a bit carry at this time is ignored since it is not desired to enter it into the adder until the next add cycle.

During the add cycle the data entered on the B input to the adder is taken from an accumulator data line 81. The line 81 connects to the #5 tap of a CD–2 unit 82, the #8 tap of which connects to the add cycle line 69. Additionally, the #10 tap of the unit 82 connects to the B input line 11. It will be recalled that during the correction cycle data taken from the adder register appears on the line 73. This line also connects to the B input line 11, and data taken from the adder register is entered into the adder during the correction cycle. Accumulator data entered on the line 81 is taken from an accumulator (not shown) wherein negative data is stored in its 10's complement form and where the accumulator data is negative, the data entered on the line 81 is in its 10's complement form.

The data entered into the A input to the adder is taken from a line 80. The line 80 connects to the #4 tap of a CD–2 unit 83 where the signals present thereon are mixed with the add cycle signal on a true add operation. As will be explained, a line 84 is high when the arithmetic operation to be performed is a true add as opposed to complement add operation. This line connects to the #9 tap of a DA unit 85 and the #10 tap of the unit 85 connects to the add cycle line 69. Thus, the #5 tap of the unit 85 and the #6 tap of the CD–2 unit 83 rise during the add cycle on true add, and the data entered on the line 80 is taken from the #3 tap of the unit 83 during these periods. The #3 and #10 taps of the unit 83 connect through an INV–3 unit 86 and through the CF–1 unit 76 to the A input line 10, thereby entering the data taken from the line 80 into the A input of the adder.

On a complement add operation the data taken from the line 80 is first inverted and is then entered into the A input to the adder. The line 80 also connects through an INV–2 unit 87 to the #4 tap of a CD–1 unit 88, the #6 tap of the unit 88 being connected to a line 89 which is high during the complement add operation, as will be explained. The #3 tap of the unit 88 connects to the #8 tap of the unit 83 and since the #5 tap of the unit 83 connects to the add cycle line 69, the inverse of the signals taken from the line 80 is entered into the A input of the adder during the add cycle on a complement add operation.

The determination of whether an operation is a true or complement add operation is made by means of the circuitry shown in FIG. 3. Referring to FIG. 3, the data line 80 connects to the #4 tap of an ID–2 unit 91, the #6 tap of this unit being connected to the $B_x$ line. Negative data present on the line 80 is identified by the presence of an "*x*" bit in the low order digit. Thus, when the data on the line 80 is negative, the #3 tap of the unit 91 drops. This tap connects to the #9 tap of a TR–2 unit 92 and pulls this trigger over if the data is negative, thereby raising the potential of the #8 tap thereof. The unit 92 is reset to lower the potential of the #8 tap by each $B_s$ pulse since the $B_s$ line connects through an INV–2 unit 93 to the #8 tap of the unit 92. Thus, when the incoming data is negative, the #8 tap of the unit 92 rises until the following $B_s$ time, the #9 tap of the unit 92 being high when the data is positive.

The #8 tap of the unit 92 connects through a CF–1 unit 94 to the #8 tap of a CD–1 unit 95 as well as to the #8 tap of a CD–1 unit 96. Similarly, the #9 tap of the unit 92 connects through the CF–1 unit 94 to the #6 tap of each of the CD–1 units 95 and 96. When the input data is to be subtracted from the accumulator data entered on the line 81, a "subtract" line 97 is controlled to go up in potential, an "add" line 98 being controlled to rise if the input data is to be added to the accumulator data. The subtract line 97 connects to the #5 tap of the unit 96 as well as to the #4 tap of the unit 95, the add line 98 being connected to the #4 and #5 taps of the units 96 and 95, respectively. When addition is indicated, i.e., when the line 98 is high, and the input data is negative or when subtraction is indicated and the input data is positive, a line 99 connected to the #3 and #10 taps of the unit 95 rises. Similarly, a line 101 connected to the #3 and #10 taps of the unit 96 rises when the input data is positive and addition is indicated or when the input data is negative and subtraction is indicated.

The lines 99 and 101 connect to the #6 and #8 taps, respectively, of a CD–2 unit 102, the #4 and #5 taps of which connect via a line 103 to the #3 tap of a CD–2 unit 104. The $C_0$ line connects to the #4 tap of the unit 104 and the $B_1$ line connects to the #6 tap of this unit. Thus, the line 103 rises during each $C_0B_1$ time, i.e., during $B_1$ time of the low order character of the data to be operated upon by the arithmetic circuitry. The line 101 rises when a true add operation is indicated, the line 99 being arranged to go up if a complement add operation is indicated. Thus, on true add a $C_0B_1$ pulse is taken from the #10 tap of the unit 102, a $C_0B_1$ pulse being taken from the #3 tap of this unit on complement add. The #10 tap of the unit 102 connects to a line 105 and through an INV–2 unit 106 to the #8 tap of a TR–2 unit 107 as well as to the #5 tap of a PCF–1 unit 108, and on a true add operation the trigger 107 is set, at $C_0B_1$ time, in a condition wherein the #8 tap thereof is low. In a similar manner, the #3 tap of the unit 102 connects via a line 109 and through the INV–2 unit 106 to the #9 tap of the trigger 107 as well as to the #4 tap of the PCF–1 unit 108, and on a complement add operation the trigger 107 is set in a condition wherein the #9 tap thereof is low, at $C_0B_1$ time. Thus, the complement add line 89 connected to the #10 tap of the unit 108 is high throughout each complement add operation, the line 84 connected to the #3 tap of the unit 108 being high throughout each true add operation.

Corrections to be added to the result stored in the adder register during the add cycle are taken from the #3 and #10 taps of a CF–2 unit 111 (FIG. 2), which taps connect to the #4 tap of the INV–3 unit 86. In the case of a true add operation, these corrections are concerned with the decimal carry. The circuitry for determining the necessity of a decimal carry is shown in FIG. 3. It will be recalled that when the sum contains an "8" bit and a "4" or a "2" bit on a true add operation, it is necessary to add 6 to the result stored in the adder register and to provide a decimal carry into the next higher order digit. For this reason the true add line 84 connects to the #10 tap of a DA unit 112. The #8 tap of the unit 112 connects to the sum line 32, the #9 tap connects to the $B_r$ line and the #7 tap of the unit 112 connects to the #3 and #10 taps of a CF–2 unit 113, which taps rise if a "4" bit or a "2" bit is present in the adder register. This is true since the #4 tap of the CF–2 unit 113 connects to the #10 tap of the CF–1 unit 56 and the #5 tap of the unit 113 connects to the #10 tap of the CF–1 unit 55, the cathode follower units associated with the "4" and "2" bits, respectively, in the adder register.

If there is an "8" bit in the sum taken from the adder via the line 32, the #8 tap of the unit 112 rises during $B_r$ time, and it will now be clear that if the sum taken from the adder contains an "8" bit and a "4" or "2" bit, the #3 and #5 taps of the DA unit 112 rise during $B_r$ time. These taps connect through an INV–2 unit 114 to the #9 tap of a TR–2 unit 115 as well as to the #4 tap of a CF–1 unit 116, and under the conditions outlined the trigger 115 is operated to lower the #9 tap and thereby raise the #8 tap thereof. This causes the potential of a line 117 connected to the #10 tap of the CF–1 unit 116 to rise and thus to indicate the necessity of a decimal carry. If the conditions are not met, there is no decimal carry and a line 118 connected to the #3 tap of the CF–1 unit 116 is high. The trigger 115 is reset at $B_4$ time since the $B_4$ line connects through the other half of the INV–2 unit 114 to the #8 tap of the trigger 115.

It is also desired to enter a decimal carry into the next higher order if there is a bit carry during the addition of "8" bits. When there is a carry during the addition of "8" bits, the line 33 rises, as explained, during the next following $B_r$ time. This line connects to the #8 tap of an ID–2 unit 119, the #5 tap of which connects to the $B_r$ line. Thus, if there is a bit carry indicated during $B_r$ time, the #10 tap of the unit 119 drops, thereby operating the trigger to indicate the necessity of a decimal carry, as explained earlier.

The decimal carry line 117 connects to the #10 tap of a DA unit 121 (FIG. 2) as well as to the #8 tap of the DA unit 85, the no-decimal-carry line 118 being connected to the #10 tap of a DA unit 122. It will be recalled that on a true add operation a +6 correction is added to the result in the adder register during the correction cycle if a decimal carry is indicated. This determination is made in the DA circuit 121. The #9 tap of the unit 121 connects to the true add line 84, the #7 tap of the unit 121 being connected to the correction cycle line 71. $B_o$ and $B_s$ pulses are connected to the #8 tap of the unit 121 since this tap connects to the #9 tap of a DO unit 123, the #5 and #6 taps of which connect to the $B_o$ and $B_s$ lines, respectively. Thus, on a true add operation if there is a decimal carry indicated, the #3 and #5 taps of the unit 121 rise during both $B_o$ and $B_s$ times. These taps connect to the #5 tap of the CF–2 unit 111 and these pulses are thus entered into the A input to the adder.

In addition to the +6 correction indicated by a decimal carry, it is necessary to add the decimal carry to the next higher order. It was mentioned that the line 117 connects to the #8 tap of the DA unit 85. The #7 tap of this unit connects to the $B_1$ line and if there is a decimal carry indicated, the #3 tap of the DA unit 85 rises during $B_1$ time. This tap connects to the #8 tap of the CD–1 unit 77, the #5 tap of which connects to the #3 tap of the INV–2 unit 78. The #4 tap of the unit 78 connects to the line 105 which, it will be recalled, rises at $C_0B_1$ time on true add operations. Thus, the #5 tap of the unit 77 is high except during $C_0B_1$ time and it will be clear that the decimal carry signal entered on the #8 tap of the CD–1 unit 77 is taken from the #10 tap thereof, which tap connects through the units 127, 128 and 76 to the carry line 12 of the adder.

On a complement add operation a +10 correction is entered into the adder during the correction cycle if no decimal carry is indicated. The $B_s$ line connects to the #4 tap of the DO unit 123, the $B_x$ line connecting to the #3 tap of the unit 123. Thus, the #7 tap of this unit rises during both $B_s$ and $B_x$ times. This tap connects to the #8 tap of the DA unit 122, the #7 tap of the unit 122 being connected to the correction cycle line 71, the #10 tap being connected to the no-decimal-carry line 118, and the #9 tap of the unit 122 being connected to the complement add line 89. Thus, during the correction cycle on complement add operations $B_s$ and $B_x$ pulses are taken from the #3 and #5 taps of the unit 122 if no decimal carry is indicated. These taps connect through the CF–2 unit 111 to the #4 tap of the INV–3 unit 86 and are thereby entered into the A input to the adder during the correction cycle when necessary. This results in adding 10 to the result stored in the adder register on complement add operations when no decimal carry is indicated.

Also on a complement add operation a carry is inserted during $B_1$ time of the low order digit to provide effectively for the conversion of the addend to 10's complement form. This pulse is taken from the line 109, which line connects to the #3 tap of the DO unit 127 and, hence, is connected to the carry input 12 of the adder. Line 109 rises during $C_0B_1$ time on complement add operations, and it will be clear, therefore, that a "1" bit is inserted in the low order digit on a complement add operation.

It should now be clear that the sum in proper binary coded decimal form will appear on the output line 74 during the next following add cycle, thus delayed by one character time.

*Appendix*

The various electronic components utilized in the machine of the invention have been shown in the drawings merely as blocks and the blocks have been labeled to indicate the type of component represented thereby. The detailed circuitry of each type of block is shown in the corresponding FIGURES 5 through 16 of the drawings. Each of the letter designations shown in the blocks denotes the function of the component in addition to acting as a reference to the detailed circuitry, and it follows that cathode followers are labeled CF, inverters are labeled INV and triggers are labeled TR, etc. Since each of the units represented by the various blocks and shown in FIGS. 5 through 16 is well known in the art, only a brief general description of its function is given herein.

The TR–2 unit shown in FIG. 5 is a bistable trigger which is operated by lowering the potential of either the #8 or #9 tap thereof, which results in reversing the condition of stability of the trigger if the tap lowered was high preceding the operation. This results in raising the potential of the opposite tap. Output signals are taken from either the #8 tap, the #9 tap or the #5 tap thereof, depending upon the polarity and/or voltages desired.

The PCF–1 unit shown in FIG. 6 is, as its designation implies, a power cathode follower. Each PCF–1 unit provides dual inputs and outputs which may be operated either independently or in parallel as is deemed necessary under the conditions determined by the engineering utilization thereof. In each of these units the #4 and #5 taps serve as input taps, the #3 and #10 taps, respectively, being the output taps.

FIG. 7 discloses an ID–2 unit, an inverter diode unit, which requires the #6 and #4 taps thereof to be high to permit the #3 tap to drop, the #3 tap being returned through a suitable load to a positive potential as indicated in the drawings where it is used. Similarly, the #5 and #8 taps of this unit must both be high to permit the #10 tap thereof to drop. Thus, the ID–2 unit provides two negative "and" gates.

FIG. 8 discloses a DO unit, a diode "or" unit, and comprises four diodes arranged in pairs. The cathodes of the diodes of each pair are connected together and are returned through a suitable resistor to 130 volts. Thus, it will be clear that if a positive signal is applied to either the #3 or the #4 tap of the DO unit, the #7 tap rises. Similarly, a positive signal applied to the #5 or #6 tap of this unit causes the #9 tap to rise. The #7 and #9 taps of the DO unit may be connected together, where required by the logic of the circuitry in which it is used, to provide a four-input "or" circuit.

The DA unit shown in FIG. 9 comprises four diodes arranged in pairs, the plates of each pair being connected together and returned through a suitable resistor to +140 volts. It will be clear, therefore, that the #3 or #5 tap of each diode pair cannot rise unless the corresponding #8 and #7 or #10 and #9 taps thereof are high. The #3 and #5 taps may be connected together to provide a four-input "and" circuit, and as long as any one of the four taps is low, the #3 and #5 taps are low.

The CD–1 circuit shown in FIG. 10, a cathode diode unit, is similar to the ID unit described above. However, in this instance the output is taken from the cathode corresponding to the pair of input taps utilized, each cathode being returned through a suitable load to either ground or a negative potential. Thus, the CD–1 unit provides two positive "and" gates.

The INV–2 unit shown in FIG. 11 is a dual inverter having input taps #4 and #5 and output taps #3 and #10, respectively. Additionally, tapped outputs may be taken from the #7 and #9 taps.

The cathode diode unit shown in FIG. 12, a CD–2 unit, is similar to the CD–1 unit described previously, but is biased differently.

FIGS. 13 and 15 depict CF–1 and CF–2 units, respectively, which units are dual cathode follower circuits having input taps #4 and #5 and output taps #3 and #10, respectively.

The INV–3 unit, a double inverter, disclosed in FIG. 14, is provided to restore the level of signals applied to the #4 tap thereof and if the output is taken from either the #5 or #10 tap, no inversion of the input signal takes place. When the output is taken from the #3 tap, however, this unit operates as a simple inverter.

FIG. 16 discloses a DD unit comprising four diodes connected as indicated in the circuit where it is used. This unit is adapted for use as an "and" circuit, an "or" circuit, or a combination thereof, as is desired.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A binary coded decimal adder of the serial type for adding numbers wherein each order of each number is defined by the occurrence of pulses at selected intervals within a first period and the first periods corresponding to adjacent orders are spaced in time by a second period, comprising binary adding means for adding together two binary coded decimal pulse trains representative of the decimal numbers being added for generating a binary coded first sum pulse train, said means being arranged to add said pulse trains during first periods of corresponding orders, means for inspecting the results of the additions corresponding to each order for controlling the generation of correction signals when said results are not in binary coded decimal form and for preventing the generation of correction signals when said results are in binary coded decimal form, and means for entering said first sum pulse train together with generated correction signals into said adding means during a corresponding second period for determining a final sum pulse train.

2. A circuit for adding binary coded decimal numbers in serial fashion wherein each order of each number is defined by a corresponding sequence of pulses occurring within a first portion of a period, comprising a binary adder, means for entering two binary coded serial pulse trains representative of decimal numbers to be added into said adder in timed relation for determining signals representative of the binary sum of corresponding orders during the first portion of the corresponding period, means responsive to binary sum signals representative of decimal quantities in excess of nine for generating correction signals, said means being responsive to binary sum signals representative of decimal quantities less than ten for preventing the generation of correction signals, means for entering said binary sum signals into said adder during a second portion of the corresponding period, and means for entering said correction signals, if any, into said adder in timed relation with the corresponding binary sum signals for converting the pure binary sum corresponding to the addition of each order of two binary coded decimal numbers to binary coded decimal form when said binary sum represents a decimal quantity in excess of nine and prior to the addition of successive orders.

3. A binary coded decimal adder of the serial type for adding digits defined by pulses occurring at selected intervals within a period, comprising a binary adder for adding together two pulse trains representative of two binary coded decimal digits being added for generating signals representative of a first sum in pure binary form, and means for converting said first sum signals from said binary form to binary coded decimal form, said converting means including means for inspecting said first sum signals, means controlled by the result of said inspection for generating correction signals only when said first sum signals are not representative of a decimal quantity which is less than ten, means for entering said correction signals when generated into said adder after said period, and means for entering said first sum signals into said adder in timed relation with said correction signals for generating signals representative of a corrected sum, whereby the corrected sum of two digits is represented in binary coded decimal form.

4. A circuit for adding binary coded decimal numbers in serial fashion wherein each digit time defines an add cycle and a correction cycle and each order of each number to be added is defined by a corresponding sequence of pulses occurring during the associated add cycle, comprising a binary adder for adding together two pulse trains of serially occurring pulses representative of two numbers to be added to generate first signals representative of the sum of said numbers in pure binary form, said adder being arranged to add pulses representative of corresponding orders of the numbers during the associated add cycles, means for entering said first signals corresponding to a given order of said numbers into a register, means responsive to the condition of said register indicative of a decimal quantity in excess of nine for generating correction signals during the correction cycle corresponding to said given order, said means being responsive to the condition of said register indicative of a decimal quantity less than ten for inhibiting the generation of said correction signals, and means for entering said correction signals, if any, together with the contents of said register into said adder during said corresponding correction cycle for generating second signals representative of the sum of said given order of said numbers in binary coded decimal form.

5. A circuit for performing complement addition of serial pulse trains representative of decimal digits wherein successive pulse positions of each pulse train represent successive terms of a binary series, comprising a binary adder, means for entering pulses representative of a first decimal digit in said adder together with pulses representative of the sixteens complement of a second decimal digit to determine sum and carry signals according to entered pulses for creating a first sum pulse train representative of the binary sum of said first digit and the sixteens complement of said second digit, means for reentering said first sum pulse train in said adder, means for generating or not generating correction pulses according to said first sum pulse train, and means for entering generated correction pulses in said adder together with said first sum pulse train to control the generation by said adder of a final sum pulse train representative of the sum of said first digit and the tens complement of said second digit.

6. The invention set forth in claim 5 wherein said correction pulse generating means is rendered operative to generate said correction pulses for entry in said adder in response to the absence of a carry signal during the addition of pulses representative of high order binary terms of said first digit and the sixteens complement of said second digit.

7. The invention set forth in claim 5 wherein said correction pulse generating means is inoperative to generate said correction pulses for entry in said adder if there is a carry signal during the addition of pulses representative of high order binary terms of said first digit and the sixteens complement of said second digit.

8. A circuit for adding decimal digits represented by serial trains of pulses in coded group form, the successive pulse positions of each group representing the value of successive terms of the binary series, comprising a binary adder, means for entering a first pulse train representative of an augend digit in a first input to said adder, means for inverting a second pulse train representative of an addend digit, means for entering said inverted pulse train into a second input to said adder, means for entering a third pulse train representative of a decimal "1" into a third input to said adder, said first, second and third pulse trains being entered in timed relation and said adder being arranged to determine sum and carry signals for generating a sum pulse train representative of the binary sum of said first, second and third pulse trains, means for reentering said sum pulse train in one of said inputs to said adder, and means for inspecting said sum pulse train for generating correction signals according thereto, said means being responsive to the absence of a carry during the addition of high order binary terms for entering said correction signals into another of said adder inputs in timed relation with the entry of said sum pulse train and for preventing the entry of said correction signals into said other input when there is a carry during the addition of high order binary terms.

9. A circuit for performing complement addition of serial pulse trains representative of decimal digits wherein successive pulse positions of each pulse train represent successive terms of a binary series, comprising a binary adder, means for entering pulses representative of a first decimal digit in said adder, means for entering pulses representative of the sixteens complement of a second decimal digit in said adder, said adder being arranged to generate sum and carry signals for creating a first sum pulse train representative of the sum of said first digit and the sixteens complement of said second digit, means for reentering said first sum pulse train in said adder, and means for entering correction pulses into said adder in timed relation with said first sum pulse train, said adder being arranged to generate sum and carry signals for creating a final sum pulse train representative of the sum of said first digit and the tens complement of said second digit when said first sum pulse train is added to said correction pulses and said correction pulse entering means being rendered ineffective according to said first sum pulse train if, after correction, said final sum pulse train will represent a decimal digit in excess of nine.

10. A circuit for performing complement addition of serial pulse trains representative of decimal digits wherein successive pulse positions of each pulse train represent successive terms of a binary series, comprising a binary adder having an A input, a B input and a carry input, means for entering a first pulse train representative of a decimal digit in said A input during a first period, means for entering the inverted form of a second pulse train representative of a second decimal digit in said B input during said first period, means for entering pulses in said carry input during said first period in timed relation with the low order binary terms of said first and second pulse trains, said adder being arranged to determine sum and carry signals according to pulses entered during said first period, means for generating a first sum pulse train in response to said sum and carry signals, means for entering said first sum pulse train in one of said adder inputs during a second period following said first period, means for generating correction signals for entering into another of said adder inputs during said second period, and means for determining the presence of a carry signal resulting from the addition of pulses representative of high order binary terms during said first period for generating a control signal, said correction signal generating means being responsive to control signals for rendering it inoperative whereby said adder generates during said second period a final sum pulse train representative of the algebraic sum of said first and second digits.

11. A binary coded decimal adder of the serial type for adding digits defined by pulses occurring at selected intervals, comprising a binary adder for adding together two pulse trains representative of two binary coded decimal digits being added for generating signals representative of a first sum in pure binary form, and means for converting said first sum signals from said binary form to binary coded decimal form, said converting means including means for inspecting said first sum signals, means controlled by the result of said inspection for generating correction signals only when said first sum signals are not representative of a decimal quantity which is less than ten, means for entering said correction signals when generated into said adder, and means for entering said first sum signals into said adder in timed relation with said correction signals for generating signals representative of a corrected sum, whereby the corrected sum of two digits is represented in binary coded decimal form.

References Cited in the file of this patent

UNITED STATES PATENTS

| | | |
|---|---|---|
| 2,705,108 | Stone | Mar. 29, 1955 |
| 2,789,760 | Rey et al. | Apr. 23, 1957 |
| 2,798,156 | Selmer | July 2, 1957 |

FOREIGN PATENTS

| | | |
|---|---|---|
| 1,059,408 | France | Nov. 10, 1953 |
| 1,064,732 | France | Dec. 30, 1953 |

OTHER REFERENCES

Richards: Arithmetic Operations in Digital Computers, published by D. Van Nostrand Co., Inc. (1955), New York (pp. 119–135).

High-Speed Computing Devices, published by McGraw-Hill Book Co. Inc. (1950), New York (pp. 289–293).